ELECTRICAL SWITCHING DEVICES

Filed July 1, 1959

INVENTORS: A. FEINER
C. A. LOVELL
T. N. LOWRY
P. G. RIDINGER
BY Henry M. Bissell
ATTORNEY 2,995,637
Patented Aug. 8, 1961

2,995,637
ELECTRICAL SWITCHING DEVICES

Alexander Feiner, Whippany, Clarence A. Lovell, Summit, and Terrell N. Lowry and Philip G. Ridinger, Boonton, N.J., assignors to Bell Telephone Laboratories, Incorporated, New York, N.Y., a corporation of New York Filed July 1, 1959, Ser. No. 824,222
29 Claims. (Cl. 200—87)

This invention relates to electrically controlled switching devices and more particularly to such devices utilizing a magnetic field to effect movement of a switch contact.

Electromagnetically controlled switches, commonly called relays, are used extensively in telephone systems, as well as elsewhere. The simplest circuit connection between a pair of subscribers in such a telephone system requires a number of relays for establishing and maintaining the connection. Presently available relays satisfy the prime requirement of a switch, namely, a high ratio of open circuit to closed circuit impedance, in a reliable, inexpensive device.

The trend in telephone switching system development has been toward ever-increasing speed of operation. At best, the minimum response time of relays known in the art is approximately 1000 times the duration of pulses which control vacuum tubes and solid state devices in electronic systems. Substitutes for relays as switching devices have been sought because of this inability to match the speed of operation required for control by electronic signaling techniques. However, such a substitute which retains the prerequisites of a switch and which is as simple, rugged, and economical as a relay heretofore has not been available.

On the other hand, it may be possible to utilize relays in an electronic switching network by interposing elements which are themselves responsive to pulses at electronic speeds and which in turn control associated relays. This practice necessarily makes the network more complex and expensive, thereby defeating the purpose for which relays are employed. What is desired, therefore, is a relay which inherently renders the mechanical switching operation compatible with electronic control techniques without complicating the conventional relay structure.

It is an object of this invention to provide an improved electrically controlled, mechanical switching device.

It is another object of this invention to eliminate the incompatibility between relays and switching signals applied to the relays at electronic speeds.

More specifically, it is an object of this invention to provide a combination of elements comprising an electromechanical switch capable of responding to high speed electronic switching signals.

It is a further object of this invention to provide an economical and reliable electromechanical switch or relay suitable for use as a link connector in the switching network of an electronic switching system.

It is an additional object of this invention to provide an improved electromechanical switch or relay suitable for inclusion in a matrix array from which element selection may be made by coincident coordinate control means.

A still further object of this invention is to provide an improved electromechanical switch or relay which is self-latching so as to eliminate the necessity for maintaining a holding current once the switch is operated.

In accordance with one specific embodiment of the instant invention a bistable, remanently magnetic member, which is responsive to electronic speed pulses, directly controls a magnetically responsive mechanical switch. Advantageously, the mechanical switch comprises a sealed reed switch, as known in the art, having a pair of magnetically responsive movable contacts, and the magnetic member comprises a material exhibiting a pair of stable remanent magnetization states. A closed flux path is provided between the switch and the bistable magnetic member by magnetically permeable members of a low-reluctance material.

Reed switches of the type employed in our invention are described in detail in "Development of Reed Switches and Relays," by O. M. Hovgaard et al., vol. 34, Bell System Technical Journal, page 309, et seq. Essentially such a switch comprises a pair of flat reeds of a magnetic material supported as cantilevers from the opposite ends of a sealed glass envelope. The reeds overlap to provide the contacts of the switch and also function directly as the relay armature in response to magnetic flux driven through the reeds.

The material of the magnetic member has a retentivity such that the material remains substantially magnetized after a magnetizing force is removed. Moreover, the direction and magnitude of magnetization are dependent upon the direction and magnitude of the magnetizing force so that a plurality of stable remanent magnetization states are exhibited by this material. Those materials classified as ferrites exhibit these characteristics and, therefore, are used advantageously in specific embodiments of the instant invention. It is well known that the remanent magnetization states of a ferrite can be established by pulses of the order of a microsecond in duration.

In accordance with an aspect of this invention the bistable remanently magnetic member comprises a pair of branches separated by an elongated aperture and joined at their corresponding ends. This arrangement permits the remanent magnetization state of the respective branches to be individually determined. Thus, in accordance with the invention, the remanent magnetization states of the two branches may be established in the same direction. As a result, opposite magnetic poles are produced at the ends of the bistable magnetic member so as to drive flux through the external magnetic circuit to close the associated switch contacts. Alternatively, the remanent magnetization states of the branches may be established in opposed directions in which case a circulating flux is developed within the magnetic member, and the magnetic poles previously existing at the ends of the member are eliminated. In this case, since no external flux is applied to the reed switch, the reed contacts are released.

Conductors are arranged adjacent to the bistable magnetic member to control the individual remanent magnetization states of the respective branches. In accordance with the invention, short current pulses on these conductors generate a magnetizing field to establish the desired flux pattern for the member in a discrete time interval substantially less than the response time of the associated switch. The switch contacts then respond in a succeeding discrete time interval to the flux condition corresponding to the established remanent magnetization states of the magnetic member branches. This flux condition is maintained until changed by succeeding current pulses. The response time of the ferrite is so much less than the response time of the associated switch that, if desired, the flux condition of the relay of this invention may be changed a number of times before the switch condition is affected. This feature may be employed to advantage, for example, to simplify the process of selecting particular ones of an array of relays such as may be arranged in a telephone switching system.

In one specific embodiment of the invention the bistable, remanently magnetic member comprises a ferrite plate having an elongated central aperture separating two branch portions of the plate. The two ends of the plate are connected by magnetically permeable members to the corresponding ends of a reed switch. The magnetically permeable members exhibit a low reluctance to magnetic flux, thus directing the maximum possible flux to the switch when opposite magnetic poles are produced at the ends of the plate. For producing these magnetic poles conductors are arranged between the plate and the switch in a substantially transverse direction. For eliminating these magnetic poles other conductors are threaded through the aperture of the plate on opposite sides of the switch.

In a second specific embodiment of the invention the bistable, remanently magnetic member comprises a pair of ferrite rods, connected to each other and to the associated reed switch at their corresponding ends by magnetically permeable means. The conductors for controlling the respective flux pattern of the device are individually wound about the ferrite rods.

Another specific embodiment of the invention provides two reed switches in combination with a pair of ferrite rods so that the switches are controlled together by the flux condition of the rods. The rods and switches are fastened together at their corresponding ends by fasteners which are both insulating and magnetically permeable. In this embodiment of the invention these properties are provided by a plastic binder in which very fine particles of a magnetic material are suspended. The resulting mixture may be readily fabricated to form the fasteners to which both the ferrite rods and the terminals of the reed switches may be directly connected.

In the last-mentioned specific embodiment the control conductors comprise a pair of windings, one of which is individually wound on a single ferrite rod with the other conductor being wound about both of the ferrite rods. This arrangement advantageously permits operation of the device on a coincident coordinate control basis which is particularly desirable in large matrix arrays, such as are common in telephone switching networks. Such control comprises the selection of a particular relay of the matrix by applying signals to selected coordinate conductors of the matrix such that only at the relay connected to these selected conductors is a sufficient magnetizing force developed to achieve a remanent magnetization reversal.

It is a feature of this invention that a magnetic member of a material having two stable remanent magnetization states be combined with a magnetically responsive mechanical switch or relay to permit actuation of the switch by the magnetic flux resulting from one of the stable remanent conditions.

Another feature of this invention is the combination of a bistable, remanently magnetic member and a magnetically responsive mechanical switch or relay to provide control of the switch by control pulses of shorter duration than the response time of the switch.

It is a further feature of this invention that a mechanical switch or relay and a bistable, remanently magnetic member comprised of two branches be combined so that a pattern of similarly directed magnetic flux in the two branches produces external magnetic poles for operating the switch while a pattern of oppositely directed magnetic flux in the respective branches develops no external poles so that the switch is released.

An additional feature of this invention is the combination of a magnetically responsive mechanical switch or relay and a bistable, remanently magnetic member in a manner which permits repeated reversals of the flux condition of the bistable member before the condition of the switch is affected.

It is a feature of one specific embodiment of this invention that a plurality of conductors be inductively coupled with a bistable, remanently magnetic member which in turn controls the contacts of an associated magnetically responsive switch so that the flux condition of the bistable member may be controlled by coincidently derived magnetizing forces.

It is a further feature of one specific embodiment of this invention that magnetically permeable, insulating end plates be connected to a plurality of magnetically responsive switches and to an adjacent bistable, remanently magnetic member which controls the switch contacts.

A complete understanding of this invention and of these and various other features thereof may be gained from consideration of the following detailed description and the accompanying drawing, in which:

FIGS. 1A and 1B schematically represent different flux conditions of a portion of our invention;

Figures 1A, 1B, 2, 3, 4:
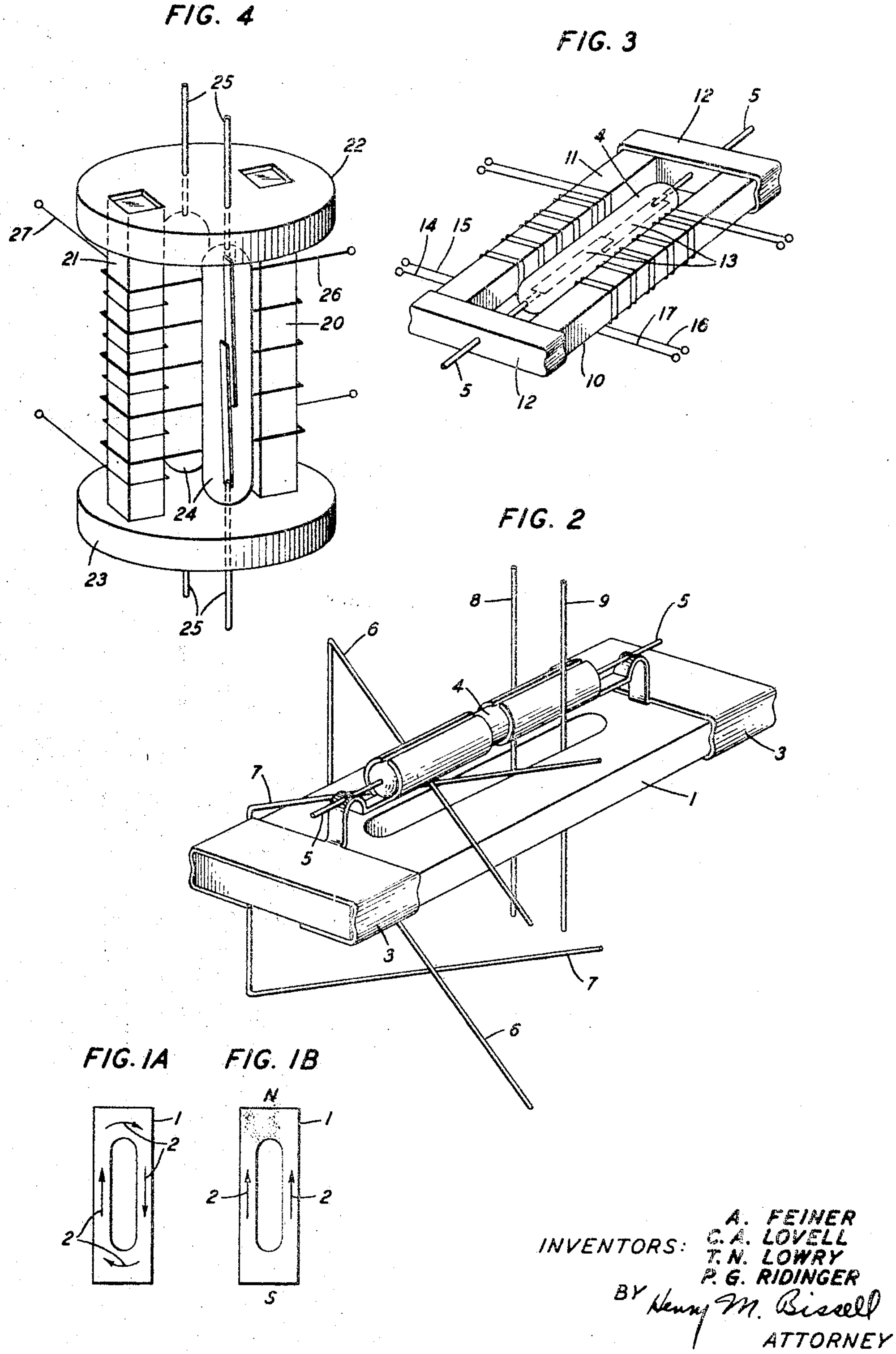
FIG. 2 represents one specific embodiment of our invention.
FIG. 3 depicts a second specific embodiment of our invention.
FIG. 4 depicts a third specific embodiment of our invention.

FIGS. 1A and 1B show an apertured plate 1 which comprises a remanently magnetic material. The arrows 2 on opposite sides of the elongated aperture represent the direction of magnetic flux within the plate 1. In FIG. 1A it can be seen that the arrows 2 are oppositely directed with respect to each other, thus representing a flux pattern in which the flux is directed in a circular or closed path within the plate 1. This condition produces no external magnetic poles at the ends of the plate 1.

In FIG. 1B it can be seen that the arrows 2, depicting the individual magnetization states of the branches on opposite sides of the elongated aperture, are both in the same direction with respect to the longitudinal direction of the plate 1. This flux condition produces opposite magnetic poles at the ends of the plate 1 as indicated, since no return path for the flux represented by the arrows 2 is provided within the plate 1.

FIG. 2 shows a plate 1 having an elongated central aperture therein. Fastened to the ends of the plate 1 are a pair of magnetically permeable members 3 which position and partially enclose a reed switch 4 having terminals 5. A first pair of conductors 6 and 7 are threaded between the switch 4 and the plate 1 and are looped about the plate 1. A second pair of conductors 8 and 9 are shown passing through the aperture of the plate 1 on opposite sides of the switch 4.

The reed switch 4 is responsive to the magnetic states of the plate 1. Its contacts close when flux is driven from opposite magnetic poles at the ends of the plate 1 through the magnetically permeable members 3 and the terminals 5 of the switch itself. Its contacts release when no magnetic flux is directed through the members 3 and the terminals 5, resulting from the elimination of the opposite magnetic poles at the ends of the plate 1. Thus the contacts of the switch 4 are released when the magnetic flux pattern depicted in FIG. 1A is established and are operated when the pattern of FIG. 1B is established.

In accordance with an aspect of this invention the specific embodiment thereof depicted in FIG. 2 is controlled on a coincident current basis. The ferrite material employed in this embodiment exhibits a substantially "square" hysteresis loop, as is known in the art. Magnetizing forces less than the coercive force of the ferrite are ineffective in reversing its remanent magnetization. However, coincident switching pulses applied on a plurality of control windings may produce a combined magnetizing force which exceeds the coercive force, thus switching the remanent magnetization of the material. In this embodiment current pulses of a predetermined amplitude are applied to the conductors 6 and 7 or 8 and 9. Closure of the contacts of the switch 4 is effected only when control pulses of the same polarity are applied simultaneously to leads 6 and 7 in which case the flux pattern depicted in FIG. 1B is established. Similarly, the flux pattern depicted in FIG. 1A is established by control pulses of like polarity applied simultaneously to conductors 8 and 9 to permit release of the contacts of the switch 4. Application of a pulse to only one of the respective conductors 6 and 7 or 8 and 9, or the application of pulses of opposite polarity to these conductors, does not affect the existing remanent magnetization states of the branches on opposite sides of the plate 1.

Once a particular flux pattern is established the control pulses may be terminated. Thereafter in its normal response time the switch 4 assumes a contact condition which corresponds to the flux pattern established in the plate 1. Thus it can readily be seen that in accordance with one aspect of our invention a structure is provided which renders the operation of an electromechanical switch compatible with the control techniques of electronic switching.

FIG. 3 depicts a second specific embodiment of our invention in which a pair of rods 10 and 11 of a remanent magnetic material are fastened together by a pair of magnetically permeable clips 12. Suspended between the rods 10 and 11 by the clips 12 is a reed switch 4 having a pair of terminals 5. Within the envelope of the switch 4 the enclosed reeds 13 are shown attached to the terminals 5 and overlapping each other to provide a contact pair. Conductors 14 and 15 are wound as interleaved coils on the rod 11 while conductors 16 and 17 are similarly wound on the rod 10.

Remanent magnetization states similar to those depicted in FIGS. 1A and 1B for the branches of the plate 1 of FIG. 2 may be individually established in the rods 10 and 11 of the specific embodiment of the invention depicted in FIG. 3. The switching of the remanent magnetization state of one of the rods 10 or 11 requires the simultaneous application of current pulses of a predetermined amplitude to both of the coils wound on that particular leg. This arrangement permits control of the device on a coincident current basis as does the specific embodiment of the invention depicted in FIG. 2.

Initially, the magnetization states in the rods 10 and 11 of the device of FIG. 3 may be established such that the flux pattern corresponds to that depicted in FIG. 1A by applying pulses of the same polarity to conductors 14, 15, 16 and 17. This flux pattern corresponds to the released state of the relay since there are no opposite magnetic poles at the clips 12 to drive flux through the switch 4. Thereafter the remanent magnetization state of one of the rods 10 or 11 may be reversed as described above to produce a flux condition similar to that depicted in FIG. 1B, thus developing opposite magnetic poles at the ends of the device which drive magnetic flux through the switch 4 to close the contacts of the reeds 13. These contacts may be released by switching the remanent magnetization state in either one of the rods 10 or 11 as already described so that a magnetic flux pattern similar to that depicted in FIG. 1A again obtains.

Obviously, once the initial remanent magnetization states of the rods 10 and 11 have been established, complete control of the device can be realized by applying pulses to only one of the rods. For example, the remanent magnetization state of the rod 10 can be left unchanged while the magnetization state of the rod 11 is switched back and forth to operate and release the switch 4.

While control of the specific embodiment depicted in FIG. 3 has been described on a coincident current basis, it is not implied that such control is required. Associated individual windings, such as 16 and 17, may be appropriately connected in series to provide in effect a single winding on the rod 10 which can control the remanent magnetization state of the rod 10.

Furthermore, if desired, opposite control windings may be connected respectively in series to attain coincident current control of both the rods 10 and 11 by applying only one pair of control pulses. Thus winding 14 may be connected in series with winding 16, while winding 15 may be connected in series with winding 17. Other arrangements of the respective control windings may occur to those versed in the art without exceeding the scope of this invention.

FIG. 4 depicts another specific embodiment of the invention which provides for the control of two reed switches in a single device. In FIG. 4 a pair of ferrite rods 20 and 21 are shown suspended between a pair of disks 22 and 23. Also suspended between the disks 22 and 23 adjacent to the rods 20 and 21 are two reed switches 24 having individual terminals 25 which protrude through the disks 22 and 23. A winding 26 encircles both of the rods 20 and 21 together. A winding 27 is shown wound about the rod 21 alone.

This specific embodiment of the invention is arranged to provide for coincident drive to operate the switches 24 but achieves release thereof by current on a single winding. Initially, to prepare the device for use a large "soak" current is applied to the winding 26. This drives the ferrite rods 20 and 21 deeply into magnetic saturation and establishes flux directions corresponding to the condition depicted in FIG. 1B, thus operating the switches 24. Once prepared in this manner, the remanent magnetization state of the rod 20 remains unaffected by future operations.

In normal operation the switches 24 of the specific embodiment of the invention depicted in FIG. 4 are released by a current applied to the winding 27 with a direction and magnitude such that the remanent magnetization of the rod 21 is reversed. This establishes a flux condition in the structure which is similar to the pattern depicted in FIG. 1A with the flux in opposite directions in the two rods 20 and 21 and circulating across through the disks 22 and 23 between the two rods, effectively bypassing the switches 24.

Closure of the switch contacts is effected by coincident drive currents applied simultaneously to the windings 26 and 27. Each of these currents is of insufficient magnitude to reverse the magnetization of the rod 21, but the magnetizing force of both coincident currents together reverses this magnetization state, thus restoring the flux pattern similar to that depicted in FIG. 1B and causing the switches 24 to operate. Because the current in the winding 26 encircling both of the rods 20 and 21 produces a magnetizing force having the same direction as the existing remanent magnetization state of the rod 20, the only effect upon the rod 20 is to drive it further into saturation.

A particular advantage of this embodiment of the invention accrues from the adaptability of the device to coincident coordinate operation. A plurality of these devices may be arranged in a matrix array to provide a switching network. The windings 26 of those relays in a particular column may be arranged in series as one vertical control lead. The windings 27 of those relays in the same row may be connected in series as one horizontal control lead. To exploit the advantage provided by this particular feature of the embodiment, operation of a selected relay in the matrix may be effected by applying drive currents to the particular horizontal and vertical control leads which are associated with the selected relay. As a result only this relay will be operated and the condition of the other relays in the matrix will be unaffected.

It is to be understood that the above-described arrangements are illustrative of the principles of the invention. Numerous other arrangements may be devised by those skilled in the art without departing from the spirit and scope of the invention.

What is claimed is:

1. An electrical switching device comprising a reed switch having a pair of contacts, a member of magnetic material having a plurality of stable remanent magnetization states connected to said switch, means for establishing magnetic flux in said switch for actuating said contacts comprising means for establishing opposite magnetic poles at opposite ends of said member, and means for eliminating said magnetic flux from said switch including means for eliminating said opposite magnetic poles.

2. An electrical switching device comprising a magnetically responsive switch, a magnetic member of a material exhibiting two stable states of remanent magnetization, said member comprising two branches on either side of an aperture, magnetically permeable means connecting said member and said switch, said switch being connected magnetically in parallel with said branches, and means for establishing a distinct remanent magnetization state in each of said branches to determine the condition of said switch.

3. An electrical switching device in accordance with claim 2 wherein said magnetic member comprises an apertured ferrite plate.

4. An electrical switching device in accordance with claim 3 wherein said means for establishing said distinct remanent magnetization state comprises first conducting means extending between said plate and said switch.

5. An electrical switching device in accordance with claim 4 wherein said first conducting means comprises a pair of wires for applying coincident magnetizing fields to said branches.

6. An electrical switching device in accordance with claim 3 wherein said means for establishing said distinct remanent magnetization state comprises second conducting means threading said aperture.

7. An electrical switching device in accordance with claim 6 wherein said second conducting means comprises a pair of wires for applying coincident magnetizing fields to said branches.

8. An electrical switching device in accordance with claim 2 wherein said branches comprise a pair of ferrite rods connected together at the ends thereof by said magnetically permeable means.

9. An electrical switching device in accordance with claim 8 wherein said means for establishing a distinct remanent magnetization state comprises conducting means individually wound on said rods.

10. An electrical switching device in accordance with claim 9 wherein said conducting means comprises a plurality of current-carrying coils for applying coincident magnetizing fields to said rods.

11. In combination, a magnetically responsive switch, magnetic means connected to the terminals of said switch comprising a first portion of a material exhibiting a pair of stable remanent magnetization states and a second portion of a magnetically permeable material connected between each of said switch terminals and said first portion, means for establishing magnetic flux through said switch including means for establishing a predetermined remanent magnetization state in each of a plurality of distinct sections of said first portion, and means for eliminating said flux through said switch including means for establishing a different remanent magnetization state in at least one of said distinct sections of said first portion.

12. The combination of claim 11 wherein said means for establishing said predetermined remanent magnetization states comprises a pair of conductors inductively linking said switch and said magnetic means.

13. The combination of claim 12 wherein said first portion of said magnetic means comprises an apertured ferrite plate.

14. The combination of claim 13 wherein said means for eliminating said flux comprises a pair of conductors threading the aperture in said ferrite plate.

15. The combination of claim 11 wherein said first portion of said magnetic means comprises a plurality of ferrite rods and further comprising means including said second portion of said magnetic means for fastening corresponding ends of said ferrite rods to said switch terminals.

16. The combination of claim 15 wherein said means for establishing said predetermined remanent magnetization state and said means for eliminating said flux through said switch comprise a plurality of conductors individually wound on said rods.

17. A switching circuit comprising a relay having a pair of contacts, a magnetic member of a material exhibiting two stable states of remanent magnetization, means for establishing a first magnetization condition in said member comprising means for setting distinct branches of said member in the same stable state to produce distinct magnetic poles at opposite ends of said member, means for establishing a second magnetization condition in said member comprising means for setting said distinct branches of said member in opposite stable states to remove the magnetic poles at said opposite ends of said member, and means for operating said relay contacts with said member in said first condition and for releasing said contacts with said member in said second condition comprising magnetically permeable means connected between said relay and the ends of said member.

18. In combination, a relay having a pair of contacts and means for controlling the operation of said contacts comprising an apertured magnetic member of a material exhibiting two stable states of remanent magnetization, magnetically permeable means connecting the ends of said relay to two remote areas on said member, a first inductive winding coupled to said member between adjacent sides of said two remote areas, a second inductive winding through said aperture coupled to said member remote from said first winding, and means for selectively energizing said first and second windings so as to establish alternatively said two stable states of remanent magnetization.

19. An electrical switching device comprising magnetically responsive switching means, a magnetic member of a material exhibiting two stable states of remanent magnetization, connecting means between said switching means and said member, means for establishing a first stable remanent flux condition in said member for operating said switching means, and means for establishing a second stable remanent flux condition in said member for releasing said switching means.

20. An electrical switching device in accordance with claim 19 wherein said magnetically responsive switching means comprises a plurality of reed switches.

21. An electrical switching device in accordance wtih claim 20 wherein said connecting means comprises particles of a magnetically permeable material suspended in a plastic insulator.

22. An electrical switching device in accordance with claim 19 wherein said means for establishing said first flux condition in said magnetic member comprises a current-conducting winding about one of a plurality of distinct portions of said member and said means for establishing said second flux condition in said magnetic member further comprises a second current-conducting winding about all of said distinct portions of said member.

23. An electrical switching device comprising magnetically responsive switching means, a bistable magnetic member of a material exhibiting a plurality of stable remanent magnetization states, magnetically permeable means connecting said member to said switching means, and means for selecting a particular flux condition for said magnetic member in one discrete time interval whereby said switching means responds to said particular flux condition in a succeeding discrete time interval after the deenergization of said selecting means.

24. An electrical switching device in accordance with claim 23 wherein said magnetically permeable connecting means comprises an insulator and said magnetically responsive switching means comprises a plurality of reed switches having their terminals extending through said connecting means.

25. An electrical switching device in accordance with claim 23 wherein said bistable magnetic member comprises a pair of rods connected together at their respective ends by said connecting means and said selecting means further comprises a first winding inductively linking both of said rods and a second winding inductively linking only one of said rods.

26. An electrical switching device comprising a magnetic member having a plurality of stable remanent magnetization states, magnetically responsive switch means, means for establishing magnetic flux in a path through said magnetic member and said magnetically responsive switch means to actuate said magnetically responsive switch means including means for selecting a first stable remanent magnetization state for said magnetic member, and means for switching said flux to a path solely within said magnetic member to release said switch means including means for selecting a second stable remanent magnetization state for said magnetic member.

27. An electrical switching device comprising a magnetic member having a plurality of stable remanent magnetization states, magnetically responsive switch means magnetically coupled to said magnetic member, and means for selectively establishing different ones of said stable remanent magnetization states of said magnetic member including means for establishing magnetic flux in a path through said magnetic member and said magnetically responsive switch means to actuate said magnetically responsive switch means and means for switching said flux away from said magnetically responsive switch means to release said switch means.

28. An electrical switching device comprising a magnetic member having a plurality of stable remanent magnetization states, magnetically responsive switch means magnetically coupled to said magnetic member, means for determining a first stable remanent state in said magnetic member to estabilsh flux in a path including said magnetically responsive switching means, and means for determining a second stable remanent state in said magnetic member to switch said flux away from said magnetically responsive switching means.

29. An electrical switching device comprising a pair of switch contacts, magnetic means of a material exhibiting a plurality of stable remanent magnetization states, means for establishing predetermined ones of said remanent magnetization states with electrical pulses of a particular time duration, and means for moving said switch contacts relative to each other in correspondence with said established remanent magnetization states after the termination of said electrical pulses.

References Cited in the file of this patent

UNITED STATES PATENTS

| | | |
|---|---|---|
| 2,037,535 | Rankin | Apr. 14, 1936 |
| 2,378,986 | Dickten | June 26, 1945 |
| 2,630,506 | Buch | Mar. 3, 1953 |
| 2,877,315 | Oliver | Mar. 10, 1959 |